(12) United States Patent
El-Berrichi

(10) Patent No.: US 9,308,785 B2
(45) Date of Patent: Apr. 12, 2016

(54) MOUNTING MEMBER HAVING A CONTINUOUS CURVATURE

(75) Inventor: Reda El-Berrichi, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 68 days.

(21) Appl. No.: 13/120,451

(22) PCT Filed: Sep. 21, 2009

(86) PCT No.: PCT/FR2009/051774
§ 371 (c)(1),
(2), (4) Date: May 11, 2011

(87) PCT Pub. No.: WO2010/034926
PCT Pub. Date: Apr. 1, 2010

(65) Prior Publication Data
US 2011/0212289 A1    Sep. 1, 2011

(30) Foreign Application Priority Data

Sep. 24, 2008 (FR) ...................................... 08 56422

(51) Int. Cl.
*B32B 3/02* (2006.01)
*B60C 23/04* (2006.01)
*B29D 30/00* (2006.01)

(52) U.S. Cl.
CPC ..... *B60C 23/0493* (2013.01); *B29D 2030/0072* (2013.01)

(58) Field of Classification Search
CPC ........ B60C 23/00; B60C 23/02; B60C 23/04; B60C 23/0491; B60C 23/0498; B60C 2019/004; B29D 2030/0061; B29D 2030/0072; B29D 2030/0077
USPC ......... 428/156, 157, 159, 161, 162, 165, 174, 428/177, 179; 156/60, 64, 110.1, 123; 340/438, 442–449, 500–502
See application file for complete search history.

(56) References Cited

U.S. PATENT DOCUMENTS 6,630,885 B2 * 10/2003 Pyne et al. .................... 340/505
(Continued)

FOREIGN PATENT DOCUMENTS

| CN | 1636773 A | 7/2005 |
|---|---|---|
| CN | 1982098 A | 6/2007 |
| CN | 101193764 A | 6/2008 |
| EP | 1 544 001 A1 | 6/2005 |

(Continued)

*Primary Examiner* — Aaron Austin
*Assistant Examiner* — Megha Gaitonde
(74) *Attorney, Agent, or Firm* — Fitzpatrick, Cella, Harper & Scinto

(57) ABSTRACT

A member (12) forming a mount for a device (26) includes:
a substantially flat bottom surface (16) for connection with a tire, delimited by a contour (20),
a top surface (24) for mounting the device (26), delimited by a contour (30),
a peripheral surface (34) forming a skirt for connecting of the contour (20) of the bottom surface (16) to the contour (30) of the top surface (24),
in which the contour (30) of the top surface (24) has a variable curvature and has a continuous variation along the contour.

15 Claims, 2 Drawing Sheets

(56) References Cited

U.S. PATENT DOCUMENTS

| | | |
|---|---|---|
| 6,885,296 B2 | 4/2005 | Hardman et al. .............. 340/505 |
| 7,186,308 B2* | 3/2007 | Metcalf et al. ................. 156/123 |
| 2005/0126668 A1* | 6/2005 | Fornerod et al. ........... 152/152.1 |
| 2006/0237109 A1 | 10/2006 | Mangold et al. ........... 152/152.1 |
| 2007/0175554 A1 | 8/2007 | Bertrand .................... 152/152.1 |
| 2009/0084480 A1 | 4/2009 | Adamson et al. .............. 152/367 |
| 2009/0115591 A1 | 5/2009 | Mancosu et al. ............... 340/447 |
| 2010/0276043 A1* | 11/2010 | Battocchio et al. ........... 152/151 |

FOREIGN PATENT DOCUMENTS

| | | | |
|---|---|---|---|
| FR | 2922486 | * | 4/2009 |
| JP | 2004-526217 A | | 8/2004 |
| JP | 2005-178761 A | | 7/2005 |
| JP | 2006-507495 A | | 3/2006 |
| JP | 2007-176479 A | | 7/2007 |
| JP | 2008-519732 A | | 6/2008 |
| WO | WO 01/38111 A1 | | 5/2001 |
| WO | WO 02/07993 A2 | | 1/2002 |

* cited by examiner

MOUNTING MEMBER HAVING A CONTINUOUS CURVATURE

FIELD OF THE INVENTION

The invention relates to the technical field of tyres for motor vehicles.

RELATED ART

Known in the prior art, notably according to document EP 1 544 001 A9, is a rubber member stuck to the internal surface of a tyre and forming a mount for an electronic device such as a pressure or temperature sensor. The rubber member is sometimes called a "patch".

The role of this member is notably to provide a mechanical decoupling between the electronic device, usually extremely rigid, and the surface of the tyre, usually flexible because it is made of rubber. Specifically it would be impossible to securely attach the electronic device directly to the surface of the tyre because that would produce zones of concentration of forces because of the great differences in rigidity between the device and the tyre. Specifically, the zones of concentration of forces risk prematurely damaging the surface of the tyre or of the member and thus prematurely breaking the attachment of the device to the tyre.

Despite the use of such a rubber member and because the tyre sustains accelerations and deformations which weaken the attachment of the member to the tyre, cracks are usually found to appear on the surface of the member, which cracks can propagate until compromising the attachment of the electronic device.

SUMMARY OF THE INVENTION

The main object of the invention is to propose a member forming a mount the mechanical strength of which is enhanced throughout the life of the tyre.

Accordingly, an embodiment of the invention is a member forming a mount for a device comprising:
 a substantially flat bottom surface for connection with a tyre, delimited by a contour,
 a top surface for mounting the device, delimited by a contour,
 a peripheral surface forming a skirt for connecting the contour of the bottom surface to the contour of the top surface,
in which at least one of the following parameters of the member:
 the curvature of the contour of the top surface, and
 the curvature of the profile of the peripheral surface, in section on any plane normal to the bottom surface and orthogonal to the tangent to the contour of the bottom surface at the point of intersection of the plane with the contour, is variable and has a continuous variation along respectively the contour and the profile.

It is noted that the curvature of a contour at a point of the contour is defined as the inverse of the radius of the circle osculating the contour at this point, that is to say of the circle conforming to the contour as closely as possible in the vicinity of the point. This is also sometimes referred to as the radius of curvature of the contour at a point in order to designate the radius of the osculating circle at this point.

Usually, the electronic devices intended to be incorporated into a tyre are of parallelepipedal shape. This is due notably to the fact that these electronic devices often comprise printed circuits made on square or rectangular boards. The member forming a mount for the device is shaped so that its top flat surface has substantially the same shape as the device, that is to say a generally rectangular shape. The corners of the top surface are optionally rounded. Such an exemplary embodiment is shown in FIG. 8 of document EP 1 544 001 A9, which shows a member in which the contour of the top surface comprises a set of straight lines joined together by curves.

The zones of the contour of the top surface of the member situated at the interface between the straight portions and the curved portions form zones of concentration of forces which are one of the causes of the premature breakage of the member attached to the surface of the tyre. Moreover, the slighter the radius of curvature, the more the forces transmitted by the tyre are localized and thus detrimental.

An aspect of the invention therefore proposes to reduce as much as possible these zones of concentration of forces by removing the changes in radii of curvature of the contour of the top surface. For this, the contour of the top surface of the member according to the invention has a variable curvature and has a continuous variation along the contour. In other words, the radius of curvature, along the contour of the top surface, changes from an infinite radius at the straight portions of the contour, if there is one, to a finite radius of the order of a few millimetres on the curved portions. The change in this radius of curvature is continuous and has no sharp variations.

By virtue of embodiments of the invention, the stresses are evenly distributed around the contour of the top surface and their intensity is consequently less. Specifically, by proposing a continuous change in the radius of curvature of the contour of the top surface, it is possible to maximize the minimum radius of curvature achieved by the contour on its curved portions.

Another feature identified by the inventors to optimize the grip of the member on the surface of the tyre is the shaping of the member so that the peripheral surface has, in section on any plane normal to the top surface and orthogonal to the tangent to the contour of the top surface at the point of intersection of the plane with the contour, a profile connecting the top surface to the bottom surface, the curvature of which is variable and has a continuous variation. This means that the change in the contour of the member, in a vertical plane, is also continuous which allows the angular zones to be limited.

The two features defined above arise from one and the same inventive concept: to give the member a shape with curvatures that change continuously, thus limiting the angular zones which may be the cause of a concentration of forces which limits the service life of the member attached to the surface of the tyre.

Naturally, these two features can be applied to a member on their own or in combination with one another.

A member according to an embodiment of the invention may also comprise one or more of the following features.
 The top surface is substantially flat.
 The top surface is of general elongate shape.
 The contour of the top surface comprises at least two opposite portions that are rectilinear and substantially parallel.
 The contour of the top surface comprises at least two opposite curved portions connecting the rectilinear portions.
 The radius of curvature of the contour varies between a minimum radius and a maximum radius, both finite.
 The contour of the top surface is defined by a spline, preferably a third-degree or fifth-degree spline. Note that a spline is a function defined by pieces by polynomials. This definition of the contour of the top surface is of particular value since the spline being a polynomial curve, the variation of its radius of curvature is continuous. Moreover, a spline is a polynomial curve the definition of which is relatively simple which makes it possible to define it so that its minimum radius of curvature is maximized.

The profile in section of the peripheral surface is a spline, preferably a third-degree or fifth-degree spline.

The profile in section of the peripheral surface joins the bottom surface at an angle of between 9° and 15°, preferably between 10° and 12°. The angle of the edges of the member is a parameter that is important to take into consideration so that the attachment of the member to the tyre is durable. Specifically, if this angle is less than 9°, an undulation of the edges appears, causing at the time of installation a risk of creases of the peripheral edge of the member that are difficult to flatten out correctly. If this angle is greater than 15°, the peripheral edge of the member is too rigid and is likely to create excessive stresses on the surface of the tyre and thus to cause breakages or separations while running.

The profile in section of the peripheral surface joins the top surface at a given angle as required, this angle may be between 0° and 25°, when it is required to have a certain transmission of forces between the tyre and the electronics; it may be negative, for example between −25° and 0° when it is desired on the contrary to decouple the electronics from the forces transmitted by the tyre.

The top and bottom surfaces are parallel.

The member is made of rubber, preferably in a single piece.

A further aspect of the invention is a tyre comprising a member as defined above.

BRIEF DESCRIPTION OF THE DRAWINGS

The invention will be better understood upon reading the following description, given only as an example, with reference to the appended drawings, in which.

DETAILED DESCRIPTION OF EMBODIMENTS OF THE INVENTION

Figure 1:
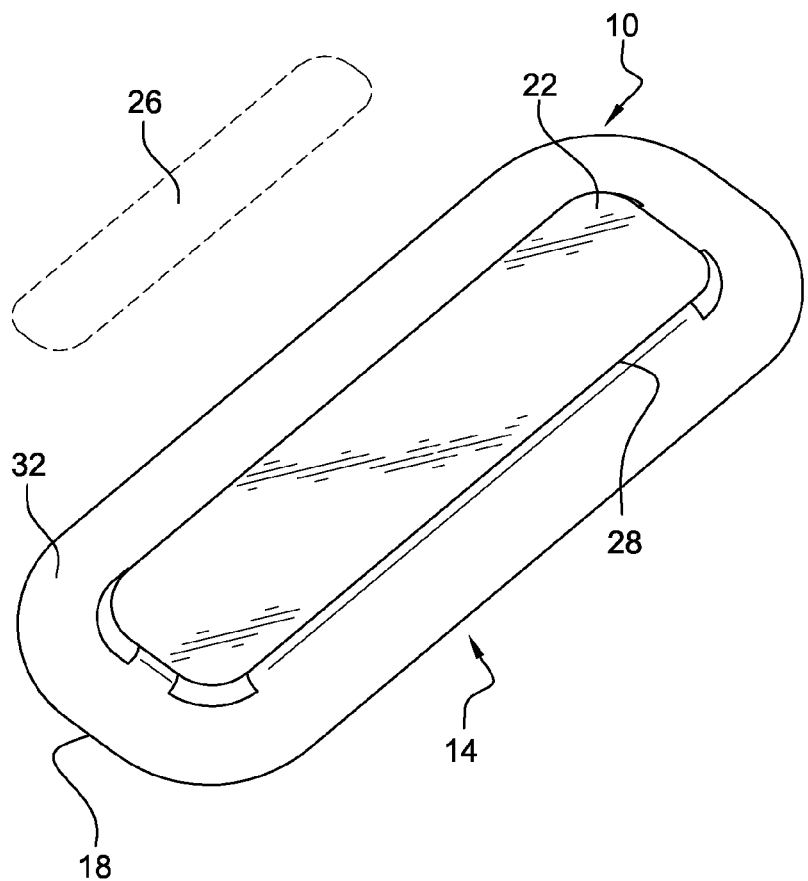
FIG. 1 is a view in perspective of a member according to the prior art.
Figure 3:
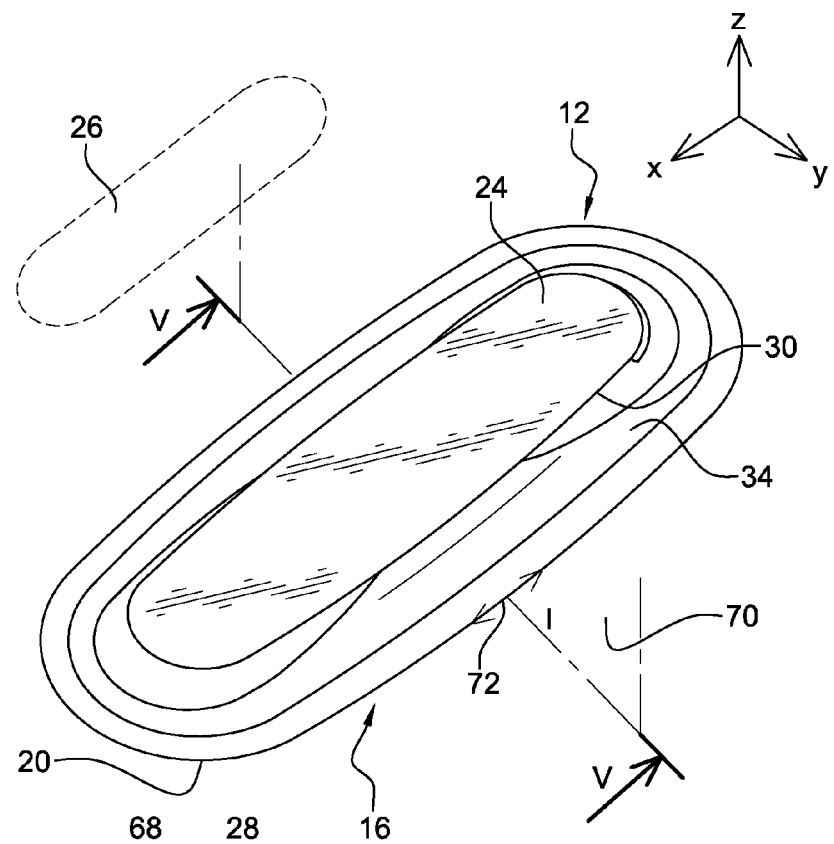
FIG. 3 is a view in perspective of a member according to an embodiment of the invention.

Shown in FIGS. 1 and 3 are two members respectively designated by the references 10 and 12 forming mounts for a device. The member 10 shown in FIG. 1 is a member according to the prior art, while the member 12 shown in FIG. 3 is a member according to an embodiment of the invention.

In the rest of the following description, the members 10 and 12 will be identified relative to an orthogonal reference system xyz in which the direction x extends in the main direction of the member 10 or 12 and in which the direction z is oriented in a vertical direction.

Each member 10 and 12 comprises respectively:
a bottom flat surface 14 and 16 for connection with a tyre (not shown), delimited by a contour 18 and 20,
a top surface 22 and 24 for mounting a device 26, schematized in FIGS. 1 and 3 by a curve in dashed line, the top surface 22 and 24 being delimited by a contour 28 and 30 and being flat in the example shown,
a peripheral surface 32 and 34 forming a skirt for connecting of the contour 18 and 20 of the bottom surface 14 and 16 to the contour 28 and 30 of the top surface 22 and 24.

In both members 10 and 12, the bottom surfaces 14 and 16 are respectively parallel to the top surfaces 22 and 24, these surfaces being substantially parallel to the plane xy.

The general shape of the surfaces 22 and 24 is convex and elongate in the direction x, the top surface 22 of the member 10 of the prior art being substantially rectangular while the top surface 24 of the member 12 of the invention is substantially oval or ellipsoid.

The shape of the top surfaces 22 and 24 is suitable for mounting the device 26. The device 26 is shown in FIGS. 1 and 3 by a dashed-line oval curve. This representation is in no circumstances limiting. Specifically, the device 26 may have any shape and any dimension. Usually, this device 26 is an electronic chip produced on a square or rectangular printed circuit. The electronic chip or device 26 may for example be a temperature or pressure sensor or a device designed to collect information concerning the manufacture of the tyre or its identity.

Figure 2:
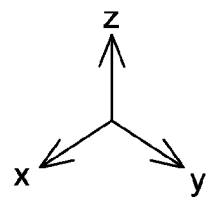
FIG. 2 is a diagram of a contour of a top surface of the member of FIG. 1.
Figure 2:
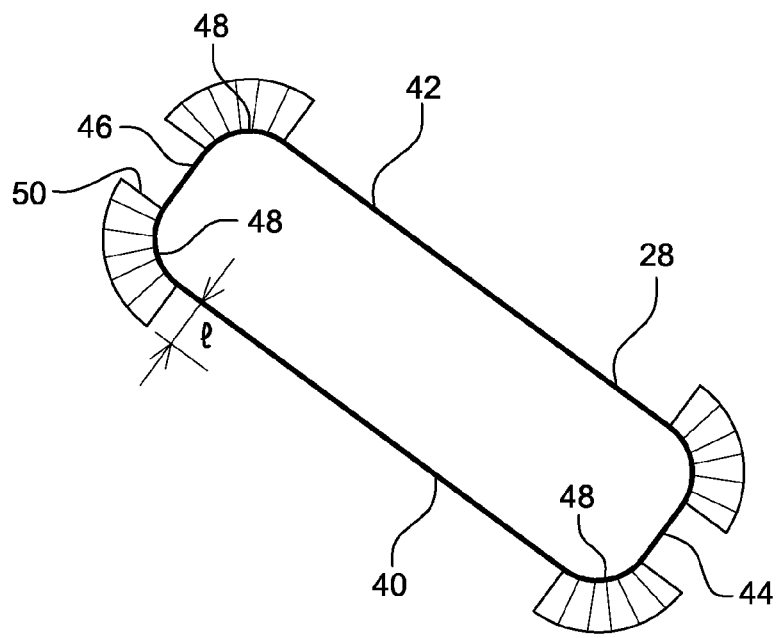

As shown in FIG. 2, the contour 28 of the member 10 of the prior art is of substantially rectangular shape and comprises two long sides 40 and 42 that are substantially rectilinear and parallel to the direction x and two short sides 44 and 46 that are substantially rectilinear and orthogonal to the sides 40 and 42 and consequently substantially parallel to the direction y. The contour 42 consequently comprises a succession of long sides and short sides. The transition between a long side and a short side is achieved by means of curved lines 48 consisting of segments of a circle, in the present case of quarters of a circle.

The curvature at a given point of the contour 42 is symbolized in FIG. 2 by a segment 50 the length of which is a function of the curvature of the drawn point. As can be seen, on the rectilinear sides 40, 42, 44 and 46, no segment 50 is represented because, the radius of curvature being infinite, the curvature is zero. On the other hand, on the curved portions for connection of the rectilinear segments, it can be seen that the segments 50 symbolizing the curvature of the contour 28 have a given length l which is the same along the whole length of the curved portion 48 of the contour 28. This curvature is constant along the whole length of the curved portion 48 because this curved portion is in an arc of a circle.

Note that the curvature of the contour 28 varies sharply from 0 to l at the junction between the curved portions 48 and the rectilinear portions. Therefore, the curvature of the contour 28 is variable but its variation is not continuous.

Figure 4:
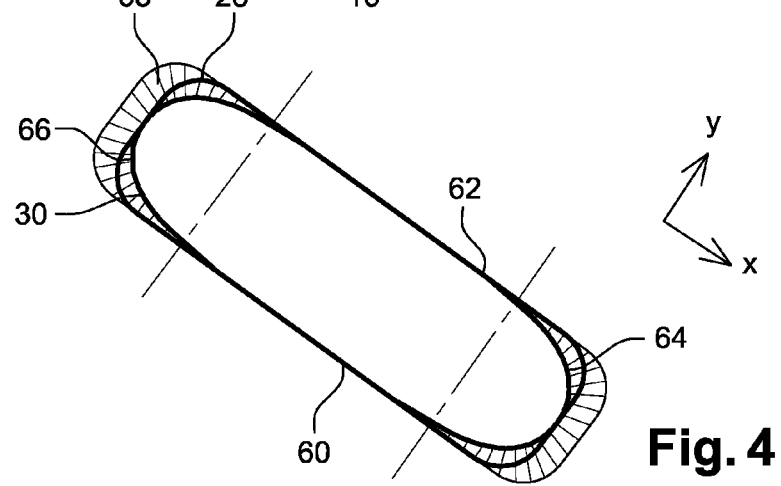
FIG. 4 is a diagram superposing the contour of the top surface of the member of FIG. 1 and a contour of a top surface of the member of FIG. 3.

FIG. 4 represents the superposition of the contour 28 of the member 10, the shape of which has just been described with reference to FIG. 2, with the contour 30 of the top surface 24 of the member 12 according to an embodiment of the invention.

The contour 30 can be analysed in the same manner as the contour 28. The contour 30 is of general elongate shape in the direction x. It comprises two straight portions 60 and 62 that are rectilinear and substantially parallel to the direction x. The straight portions 60 and 62 are connected to one another by means of curved portions 64 and 66.

In the same manner as in FIG. 2, FIG. 4 shows an assembly of segments 68 placed orthogonally to the contour 30 in order to quantify the curvature of this contour at all points.

Note that on the straight portions 60 and 62, the curvature of the contour is zero. On the other hand, on the curved portions 64 and 66, the curvature of the contour 30 varies and is not zero. As can be seen, the variation of the curvature of the contour 30 is continuous and comprises no sharp change. Note moreover that the maximum curvature achieved by the curved portions 64 and 66 is less than the curvature of the contour 28 of the member 10 of the prior art on its curved portions 48.

In other words, the contour 30 of the top surface 24 of the member 12 according to the invention has a variable curvature and has a continuous variation all along the contour 30.

It will be noted that, for one and the same length and one and the same width of the top surfaces 22 and 24 of the respective members 10 and 12, the minimum radius of curvature of the surface 24 of the member of the invention is for example 6.2 mm, while the minimum radius of curvature of the surface 22 of the member of the prior art is 4.9 mm. Consequently, the invention makes it possible to maximize the minimum radius of curvature of the top surface of the member.

The shape of the contour 30 of the member 12 of an embodiment of the invention is obtained mathematically by means of a curve of spline type. Note that a spline is a polynomial curve defined by pieces. Preferably, the spline used is a third-degree or fifth-degree spline.

According to another aspect of the invention, attention is paid to the shape in section of the peripheral surface 34 of the member 12 according to an embodiment of the invention. For this, a plane 70 parallel to the plane yz is defined, that is to say normal to the bottom surface 16 of the member and orthogonal, at a point I of intersection of the plane with the contour 20 of the bottom surface 16, to the tangent 72 to the contour 20 at the point I.

Figure 5:
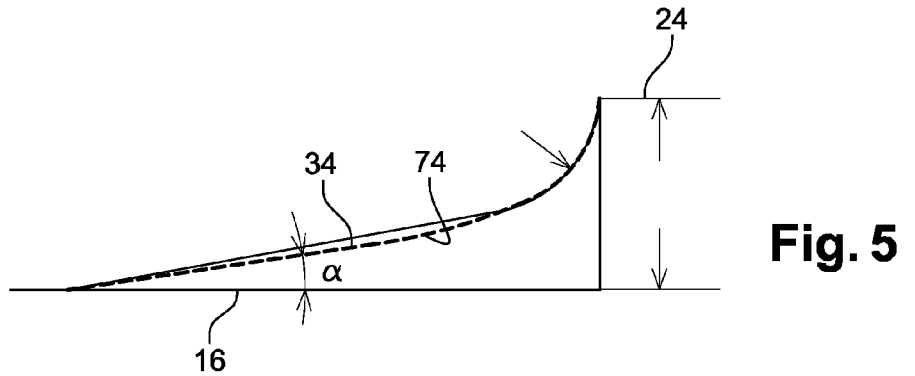
FIG. 5 is a diagram in cross section of a peripheral surface of the member of FIG. 3.

FIG. 5 represents a section of the peripheral surface 34 on the plane 70, on the one hand of the member 10 of FIG. 1 in continuous line, and on the other hand of the member 12 of FIG. 3 in discontinuous line.

Note in this FIG. 5 that the peripheral surface 34 of the member 12 according to an embodiment of the invention has in this plane a profile 74 connecting the top surface 24 to the bottom surface 16 and that this profile 74 has a variable curvature the variation of which is continuous. The profile 74 does not have any sharp change of gradient unlike the profile of the peripheral surface of the member 10 of the prior art which comprises a straight portion connected sharply to a curved portion.

According to an embodiment of the invention, the peripheral surface 34 of the member is such that, irrespective of the sectional plane 70 used and verifying the features mentioned above, the profile 74 of the peripheral surface 34 has a variable curvature the variation of which is continuous.

Moreover, the profile 74 of the surface 34 joins the bottom surface at an angle α of between 9° and 15°.

Tests have shown that by designing a member of which the curvatures are continuous, the lifetime of the attachment of the member to the surface of the tyre is considerably increased.

Finally, note that the exemplary embodiments shown in the figures are by way of illustration only. Specifically, the member according to one or more embodiments of the invention may comprise a top surface of asymmetrical shape comprising for example one end wider than the other, the curvature of the top surface may be locally negative or positive, the top and bottom surfaces may or may not be parallel, etc.

The invention claimed is:

1. A member forming a mount for a device, comprising:
a flat bottom surface for connecting with a tyre, the flat bottom surface facing the tyre and being delimited by a bottom surface perimeter contour;
a top surface for mounting the device directly thereon, the top surface having an elongate shape, the top surface being an uppermost surface of the member, and the top surface being delimited by a top surface perimeter contour having curved end portions that are positioned on opposite short ends of the top surface; and
a peripheral surface forming a skirt for connecting the bottom surface perimeter contour to the top surface perimeter contour,
wherein
(i) a curvature of at least the end portions of the top surface perimeter contour has a continuous variation along an entirety thereof, or
(ii) a curvature of any cross-sectional profile of the skirt that intersects both the top surface perimeter contour and the bottom surface perimeter contour and is perpendicular to the bottom surface perimeter contour has a continuous variation along an entirety of the cross-sectional profile, or
(iii) both (i) and (ii).

2. The member according to the claim 1, wherein the top surface is flat.

3. The member according to claim 1, wherein the top surface perimeter contour includes at least two opposite rectilinear portions that are parallel.

4. The member according to claim 3, wherein the end portions of the top surface perimeter contour are connected to the rectilinear portions.

5. The member according to claim 1, wherein a radius of curvature of the end portions of the top surface perimeter contour varies between a minimum radius and a maximum radius, both the minimum radius and the maximum radius being finite.

6. The member according to claim 1, wherein the end portions of the top surface perimeter contour are defined by a spline.

7. The member according to claim 6, wherein the spline is of a third-degree or a fifth-degree.

8. The member according to claim 1, wherein the cross-sectional profile of the skirt is defined by a spline.

9. The member according to claim 8, wherein the spline is of a third-degree or a fifth-degree.

10. The member according to the claim 8, wherein the cross-sectional profile of the skirt joins the bottom surface at an angle of between 9 degrees and 15 degrees.

11. The member according to claim 8, wherein the cross-sectional profile of the skirt joins the top surface at an angle of between −25 degrees and 25 degrees.

12. The member according to claim 1, wherein the top surface and the bottom surface are parallel.

13. The member according to claim 1, wherein the member is made of rubber.

14. A tyre comprising a member forming a mount for a device, the member including:
a flat bottom surface for connecting with a tyre, the flat bottom surface facing the tyre and being delimited by a bottom surface perimeter contour;
a top surface for mounting the device directly thereon, the top surface having an elongate shape, the top surface being an uppermost surface of the member, and the top surface being delimited by a top surface perimeter contour having curved end portions that are positioned on opposite short ends of the top surface; and
a peripheral surface forming a skirt for connecting the bottom surface perimeter contour to the top surface perimeter contour, wherein
- (i) a curvature of at least the end portions of the top surface perimeter contour has a continuous variation along an entirety thereof, or
- (ii) a curvature of any cross-sectional profile of the skirt that intersects both the top surface perimeter contour and the bottom surface perimeter contour and is perpendicular to the bottom surface perimeter contour has a continuous variation along an entirety of the cross-sectional profile, or
- (iii) both (i) and (ii).

15. A member forming a mount for a device, comprising:
a flat bottom surface for connecting with a tyre, the flat bottom surface facing the tyre and being delimited by a bottom surface perimeter contour;
a top surface for mounting the device directly thereon, the top surface having an elongate shape, the top surface being an uppermost surface of the member, and the top surface being delimited by a top surface perimeter contour having curved end portions that are positioned on opposite short ends of the top surface; and
a peripheral surface forming a skirt for connecting the bottom surface perimeter contour to the top surface perimeter contour,
wherein
- (i) a curvature of at least the end portions of the top surface perimeter contour has a continuous variation along an entirety thereof, or
- (ii) any cross-sectional profile of the skirt that intersects both the top surface perimeter contour and the bottom surface perimeter contour and is perpendicular to the bottom surface perimeter contour has a continuous variation along an entirety of the cross-sectional profile, or
- (iii) both (i) and (ii).

* * * * *

UNITED STATES PATENT AND TRADEMARK OFFICE
CERTIFICATE OF CORRECTION

Page 1 of 1

PATENT NO. : 9,308,785 B2
APPLICATION NO. : 13/120451
DATED : April 12, 2016
INVENTOR(S) : Reda El-Berrichi It is certified that error appears in the above-identified patent and that said Letters Patent is hereby corrected as shown below:

TITLE PAGE [56] REFERENCES CITED

U.S. Patent Documents
"6,630,885 B2*   10/2003   Pyne et al.," should read
--6,630,885 B2*   10/2003 Hardman et al.--.

Signed and Sealed this
Nineteenth Day of July, 2016

Michelle K. Lee
*Director of the United States Patent and Trademark Office*